(No Model.) 2 Sheets—Sheet 1.

J. & J. E. MYERS.
COTTON HARVESTER.

No. 286,055. Patented Oct. 2, 1883.

WITNESSES:
Chas. Nida
C. Sedgwick

INVENTOR:
J. Myers
J. E. Myers
BY Munn & Co.
ATTORNEYS.

(No Model.) 2 Sheets—Sheet 2.
J. & J. E. MYERS.
COTTON HARVESTER.
No. 286,055. Patented Oct. 2, 1883.
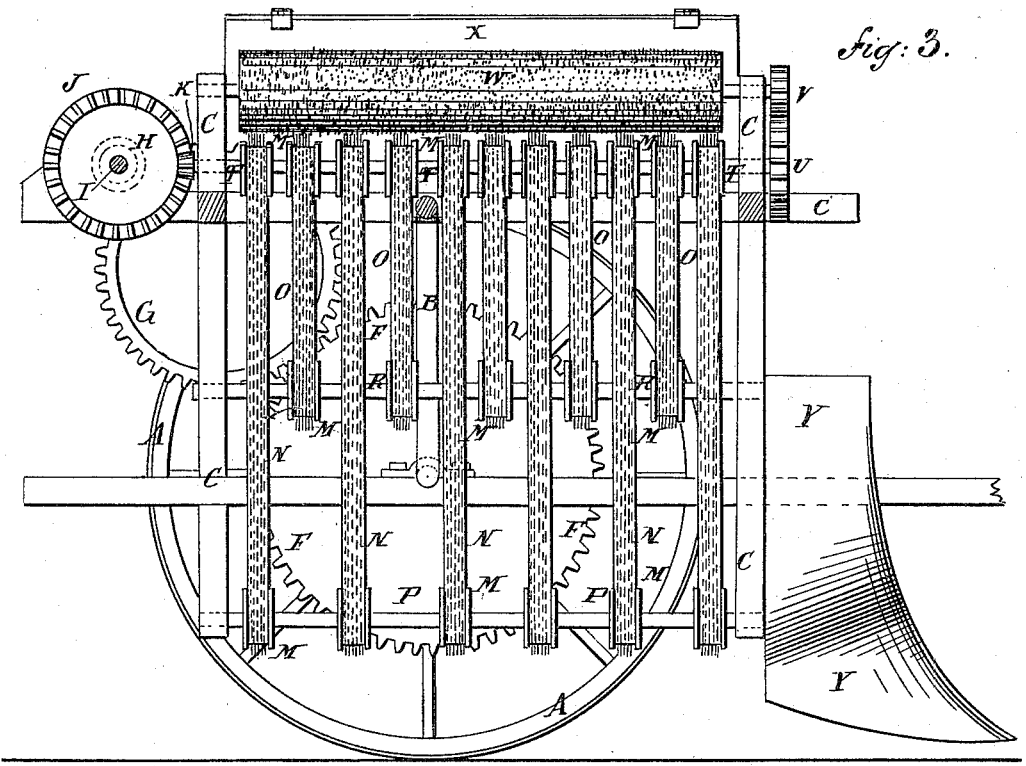
Fig: 3.
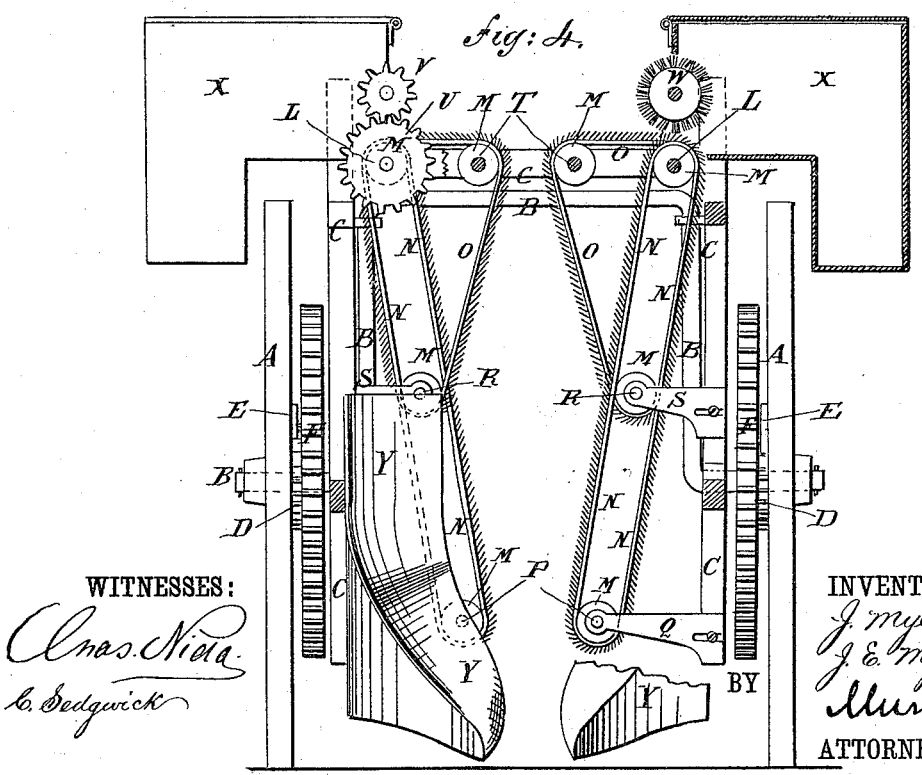
Fig: 4.
WITNESSES:
Chas. Nietz
C. Sedgwick
INVENTOR:
J. Myers
J. E. Myers
BY Munn & Co.
ATTORNEYS.

UNITED STATES PATENT OFFICE.

JOHN MYERS AND JOHN EDWARD MYERS, OF PALESTINE, TEXAS.

COTTON-HARVESTER.

SPECIFICATION forming part of Letters Patent No. 286,055, dated October 2, 1883.

Application filed July 6, 1883. (No model.)

*To all whom it may concern:*

Be it known that we, JOHN MYERS and JOHN EDWARD MYERS, both of Palestine, in the county of Anderson and State of Texas, have invented certain new and useful Improvements in Cotton-Harvesters, of which the following is a full, clear, and exact description.

Reference is to be had to the accompanying drawings, forming part of this specification, in which similar letters of reference indicate corresponding parts in all the figures.

Figure 1:
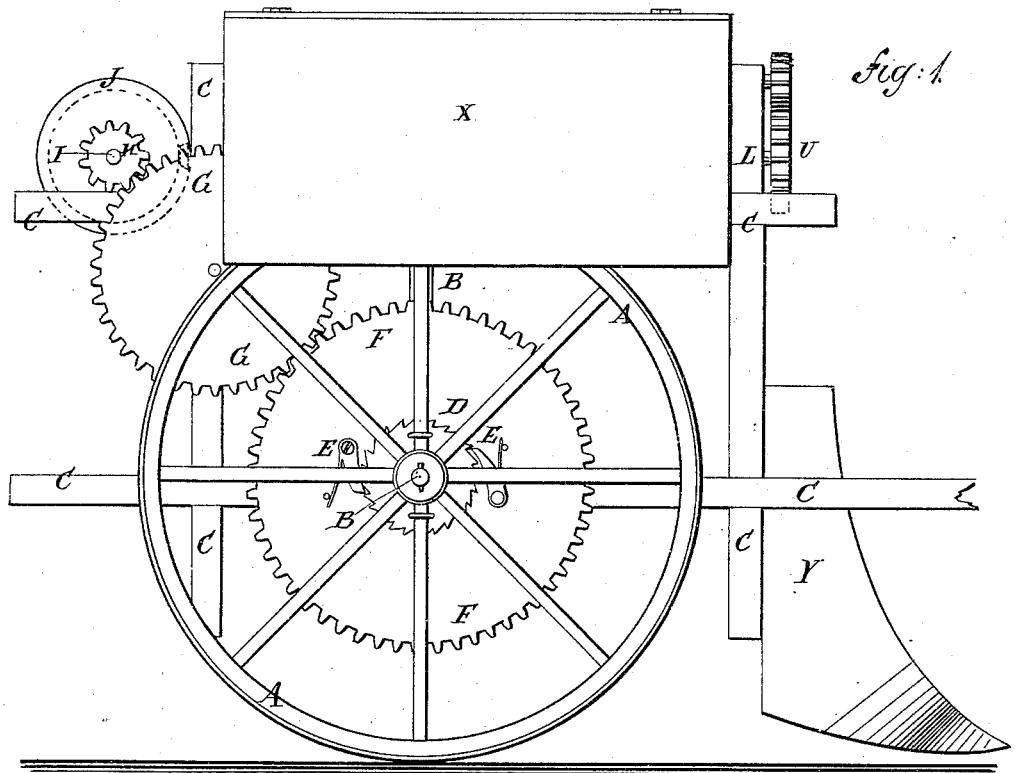
Figure 2:
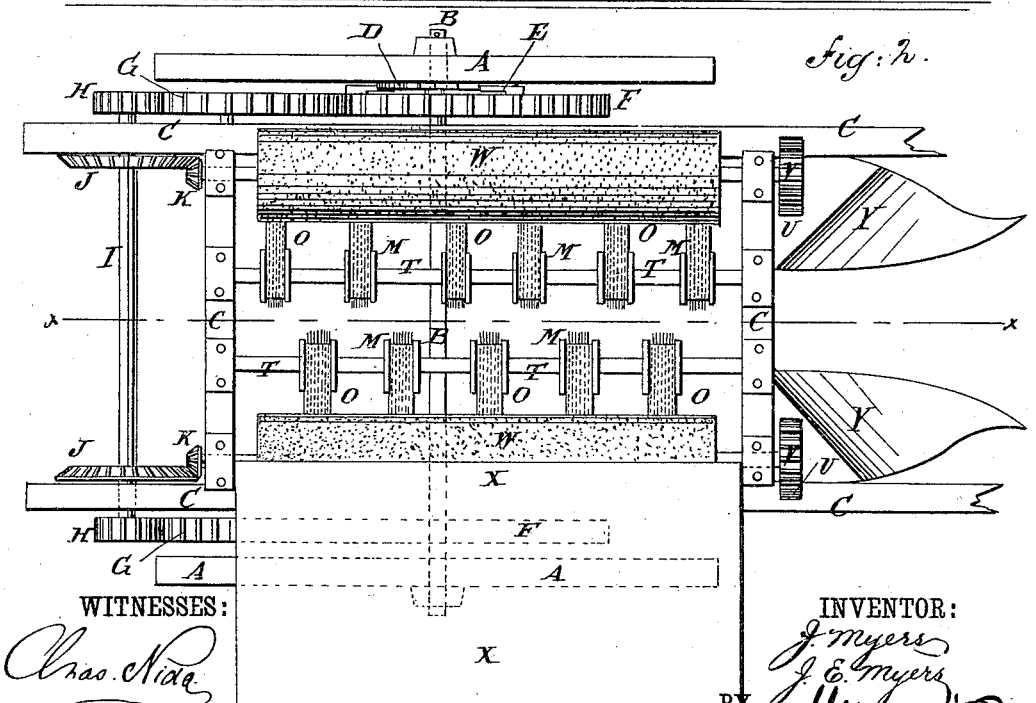

Figure 1, Sheet 1, is a side elevation of our improvement. Fig. 2, Sheet 1, is a plan view of the same, one of the cotton-receiving boxes being removed. Fig. 3, Sheet 2, is a sectional side elevation of the same, taken through the line $x\ x$, Fig. 2. Fig. 4, Sheet 2, is a front elevation of the same, partly in section.

The object of this invention is to facilitate the picking of cotton from the plants.

The invention consists in a cotton-harvester constructed with a frame carrying shafts provided with flanged pulleys, around which pass a series of alternating long and short toothed belts, the said shafts being driven from the drive-wheels of the machine by a connecting-gearing. With the toothed belts are connected brushes rotated from the driving mechanism of the machine to remove the cotton from the teeth of the belts and deposit it in receiving-boxes attached to the sides of the machine-frame, as will be hereinafter fully described.

A represents the drive-wheels, to the arched axle B of which is attached the frame C of the machine.

To the inner sides of the wheels A are secured by bolts or other suitable means the ratchet-wheels D, with the teeth of which engage the spring-pawls E, attached to the gear-wheels F, placed loose upon the axle B at the inner sides of the said drive-wheels A, so that the said gear-wheels will be driven by the forward revolution of the said drive-wheels. With this construction one or both the drive-wheels can be turned back without operating the mechanism, and one of the drive-wheels can be turned faster than the other without affecting the operation of the mechanism. The teeth of the gear-wheels F mesh into the teeth of the intermediate gear-wheels, G, journaled to the frame C, and the teeth of which mesh into the teeth of the small gear-wheels H, attached to the ends of the shaft I. The shaft I crosses the upper part of the rear end of the frame C, is journaled in bearings attached to the said frame, and to it, at the inner sides of the side bars of the frame C, are attached large beveled-gear wheels J, the teeth of which mesh into the teeth of the small beveled-gear wheels K, attached to the rear ends of the shafts L. The shafts L are journaled in bearings attached to cross-bars of the frame C at the inner sides of the top side bars of the said frame.

To the shafts L are attached series of flanged pulleys M, around every other one of which passes a long toothed belt N, and around the others pass shorter toothed belts O. The long belts N also pass around flanged pulleys M, attached to the shaft P, which is journaled in bearings in brackets Q, attached to the lower parts of the frame C, so that the lower parts of the said belts N will be farther inward than the upper parts, to adapt the said toothed belts to remove the cotton from the sides of the plants. The short belts O pass around flanged pulleys M, attached to the shafts R, which are journaled in brackets S, attached to the middle parts of the sides of the frame C. The brackets Q S are slotted to receive the fastening-bolts, so that they can be adjusted to set the lower parts of the belts N O in or out, as the size of the plants may require. The short belts O also pass around flanged pulleys M, attached to the shafts T, journaled in bearings attached to the cross-bars of the frame C, upon the opposite sides of and at a little distance from the centers of the said cross-bars, so that the upper parts of the said belts O will be farther inward than their lower parts to adapt the said belts to remove the cotton from the tops of the plants. The belts N O are arranged with a long belt, N, upon one side of the machine opposite a short belt, O, upon the other side of the machine, so that the belts will pass in among the branches of the plants, and the said plants will be swayed back and forth by the said belts as the machine is drawn forward, bringing all parts of the plants in contact with the said belts and insuring a thorough gathering of the cotton.

To the forward ends of the shafts L are attached gear-wheels U, the teeth of which mesh into the teeth of smaller gear-wheels V, attached to the forward journals of the cylindrical brushes W, journaled to the frame C directly over the shafts L, as shown in Fig. 4, so that the brushes will move faster than the belts N O, to remove the cotton from the teeth of the said belts and deposit it in the receiving-boxes X, attached to the upper parts of the sides of the frame C.

To the forward ends of the side parts of the frame C are attached guides Y, made somewhat similar to mold-board plows to raise low and downwardly-inclined branches of the plants and cause them to pass between the belts N. The teeth of the belts N O incline forward in the manner of the teeth of carding-belts, as shown in Fig. 4, so as to readily remove the cotton from the bolls and carry it securely until it is removed from the said teeth by the action of the brushes W. With this construction, as the machine is drawn along a row of plants, the cotton will be thoroughly removed from all the open bolls, and with a less admixture of leaves and other rubbish than is usual in hand-picking.

We do not abandon or dedicate to the public any patentable feature set forth herein and not hereinafter claimed, but reserve the right to claim the same either in a reissue of any patent that may be granted upon this application or in other applications for Letters Patent that we may make.

Having thus described our invention, what we claim as new, and desire to secure by Letters Patent, is—

1. A cotton-harvester constructed substantially as herein shown and described, and consisting of a frame, a series of alternating long and short toothed belts, a pair of clearing-brushes, a pair of receiving-boxes, and a driving mechanism, as set forth.

2. In a cotton-harvester, the combination, with the frame C and the driving mechanism, of the shafts L P R T, the flanged pulleys M, and the alternating long and short toothed belts N O, substantially as herein shown and described, whereby the cotton is removed from the bolls of the plants, as set forth.

3. In a cotton-harvester, the combination, with the frame C, the toothed belts N O, and the driving mechanism, of the rotary brushes W and the receiving-boxes X, substantially as herein shown and described, whereby the cotton is removed from the toothed belts and preserved, as set forth.

4. In a cotton-harvester, the combination, with the frame C and the toothed belts N O, of the curved guides Y, substantially as herein shown and described, whereby low and downwardly-inclined branches will be raised and guided to the said belts, as set forth.

5. In a cotton-harvester, the combination, with long toothed belts N, having their lower parts the farthest inward of the short toothed belts O, having their upper parts the farthest inward, substantially as herein shown and described, whereby the cotton will be taken from the sides and tops of the plants, as set forth.

JOHN MYERS.
JOHN EDWARD MYERS.

Witnesses:
WILLIAM T. MILTON,
G. W. GILBERT.